(12) United States Patent
Kawano

(10) Patent No.: US 9,798,501 B2
(45) Date of Patent: Oct. 24, 2017

(54) IMAGE FORMING APPARATUS, NON-TRANSITORY COMPUTER-READABLE STORAGE MEDIUM STORING OPERATION CONTROL PROGRAM, AND OPERATION CONTROL METHOD

(71) Applicant: KONICA MINOLTA, INC., Chiyoda-ku, Tokyo (JP)

(72) Inventor: Tatsuya Kawano, Musashino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/274,478

(22) Filed: Sep. 23, 2016

(65) Prior Publication Data
US 2017/0090833 A1    Mar. 30, 2017

(30) Foreign Application Priority Data
Sep. 28, 2015    (JP) ................................ 2015-189168

(51) Int. Cl.
*G06F 3/12*    (2006.01)
*H04N 1/00*    (2006.01)

(52) U.S. Cl.
CPC .......... *G06F 3/1224* (2013.01); *G06F 3/1203* (2013.01); *G06F 3/124* (2013.01);
(Continued)

(58) Field of Classification Search
CPC ...... G06F 3/1224; G06F 3/1203; G06F 3/124; G06F 3/1286; H04N 1/00204;
(Continued)

(56) References Cited

U.S. PATENT DOCUMENTS

2003/0007178 A1*  1/2003  Jeyachandran ........ G06K 15/00
                                                        358/1.15
2005/0128505 A1*  6/2005  Shirai ................ H04N 1/00954
                                                        358/1.14
(Continued)

FOREIGN PATENT DOCUMENTS

JP    2000-181653    6/2000
JP    2004-102333    4/2004
(Continued)

OTHER PUBLICATIONS

Notification of Reasons for Refusal issued in corresponding Japanese Patent Application No. 2015-189168, dated Jul. 4, 2017, with English Translation (6 pages).

*Primary Examiner* — Allen H Nguyen
(74) *Attorney, Agent, or Firm* — Buchanan Ingersoll & Rooney PC

(57) ABSTRACT

Provided are an image forming apparatus, a non-transitory computer-readable storage medium storing an operation control program and an operation control method. The image forming apparatus includes an image forming unit, a server processing unit, and a group management unit that manages one or more of other image forming apparatuses each including a server processing unit as a first apparatus group, and manages one or more of other image forming apparatuses chosen as a second apparatus group. The image forming apparatus further includes a judgement unit that judges whether the image forming apparatus is in a state capable of executing processing at a processing request received, and a proxy execution control unit that, on judging that the image forming apparatus is not in the state, requests an image forming apparatus belonging to the first or second apparatus group for proxy execution of the processing, according to the kind of processing request.

19 Claims, 8 Drawing Sheets

(52) U.S. Cl.
CPC ....... *G06F 3/1286* (2013.01); *H04N 1/00204* (2013.01); *H04N 1/00347* (2013.01); *H04N 2201/0039* (2013.01); *H04N 2201/0094* (2013.01)

(58) Field of Classification Search
CPC ....... H04N 1/00347; H04N 2201/0094; H04N 2201/0039
USPC ....................................................... 358/1.15
See application file for complete search history.

(56) References Cited

U.S. PATENT DOCUMENTS

| | | | | |
|---|---|---|---|---|
| 2005/0141013 | A1* | 6/2005 | Kikuchi | G06F 3/1204 358/1.14 |
| 2006/0050294 | A1* | 3/2006 | Smith | G06F 3/1204 358/1.15 |
| 2006/0244991 | A1 | 11/2006 | Tenger et al. | |

FOREIGN PATENT DOCUMENTS

| | | |
|---|---|---|
| JP | 2005-038096 | 2/2005 |
| JP | 2006-309625 A | 11/2006 |
| JP | 2011-170412 | 9/2011 |

* cited by examiner

IMAGE FORMING APPARATUS, NON-TRANSITORY COMPUTER-READABLE STORAGE MEDIUM STORING OPERATION CONTROL PROGRAM, AND OPERATION CONTROL METHOD

The entire disclosure of Japanese Patent Application No. 2015-189168 filed on Sep. 28, 2015 including description, claims, drawings, and abstract are incorporated herein by reference in its entirety.

TECHNICAL FIELD

The present invention is directed to image forming apparatuses, non-transitory computer-readable storage media each storing an operation control program, and operation control methods. In particular, the present invention is directed to an image forming apparatus equipped with server functions, a non-transitory computer-readable storage medium storing an operation control program for controlling operations of the image forming apparatus, and a method for controlling operations of the image forming apparatus.

BACKGROUND

There is a certain type of image forming apparatus like a MFP (Multi-Functional Peripheral) that not only supports basic functions including print functions, copy functions, scan functions, fax functions and others (which are referred to as image forming functions as a general term for these functions), but also supports server functions including Web server functions and/or file server functions. Such type of image forming apparatus is now coming on the market.

A consideration is given to such an image forming apparatus providing server functions, configured to execute both processing relating to the image forming functions and processing relating to the server functions on one and same processing unit. When requests to use the server functions, sent from client terminals are centralized on one image forming apparatus that is executing of a print job, it can affect the execution of the print job. For example, the centralization of requests can increase the load on a CPU (Central Processing Unit) and memory usage of the image forming apparatus and can result in deterioration about performance of the execution of the print job which is executed together with processing relating to the server functions in parallel. Further, the centralization of requests can affect real-time control of mechanical components of the image forming apparatus, which relate to execution of the print job, and real-time image processing in the image forming apparatus. It can result in deterioration about reliability of the execution of the print job.

DESCRIPTION OF THE RELATED ART

With regard to the above-described technology to control the deterioration about performance of execution of a print job, for example, Japanese Unexamined Patent Publication No. 2006-309625 (corresponding to US2006/0244991A1) discloses the following image processing apparatus which is communicable with other image processing apparatuses through a network, though it is not a technology relating to an image forming apparatus equipped with server functions. The image processing apparatus includes a communication unit for communicating with the other image processing apparatuses, and a controller. The controller is configured to make a judgment, on the basis of information concerning a print job in the another image processing apparatus, obtained through the communication unit, whether it is preferable to execute the print job in the image processing apparatus rather than to execute the print job in the another image processing apparatus, and causes the another image processing apparatus to transfer the print job to the image processing apparatus according to the judgment result.

In the above-described technology disclosed in JP-A No. 2006-309625, a processing load is estimated for processing arising from a print job, but no consideration is made for another type of processing load, which changes with the number of connections from client terminals, like a processing load of requests to use server functions. Therefore, it is difficult for an image forming apparatus equipped with server functions to secure performance and reliability of execution of a print job, by using the disclosed technology, in the condition that requests to use server functions are centralized on the image forming apparatus during execution of a print job.

SUMMARY

The present invention is directed to image forming apparatuses, non-transitory computer-readable storage media each storing an operation control program and operation control methods, which can avoid deterioration about performance and reliability of execution of a print job in an image faulting apparatus equipped with server functions.

An image forming apparatus reflecting one aspect of the present invention is an image forming apparatus to be connected to a client terminal and a plurality of other image forming apparatuses in a local area network so as to be capable of data communication with each other. The image forming apparatus comprises an image forming unit that performs image forming processing on a basis of a print job, and a server processing unit that performs server processing to send the client terminal data requested by the client terminal. The image forming apparatus further comprises a group management unit that manages one or more image forming apparatuses each including a server processing unit that performs the server processing among the plurality of other image forming apparatuses, as a first apparatus group, and further manages one or more image forming apparatuses chosen out of the plurality of other image forming apparatuses on a basis of a predetermined standard, as a second apparatus group. The image forming apparatus further comprises a judgement unit that analyzes packet data received from the client terminal, judges whether a processing request given by the packet data is a data request to the server processing unit or a request to the image forming unit for image forming processing, and judges whether the image forming apparatus is in a state capable of executing processing at the processing request. The image forming apparatus further comprises a proxy execution control unit that, on judging that the processing request is a data request to the server processing unit and the image forming apparatus is in a state incapable of executing the processing at the processing request, requests one of the plurality of other image forming apparatuses belonging to the first apparatus group to execute server processing as proxy for the image forming apparatus, and on judging that the processing request is a request to the image forming unit for image forming processing and the image forming apparatus is in a state incapable of executing the processing at the processing request, requests one of the plurality of other image forming apparatuses belonging to the second apparatus group to execute the image forming processing as proxy for the image forming apparatus.

A non-transitory computer-readable storage medium reflecting one aspect of the present invention stores an operation control program to be executed in an image forming apparatus to be connected to a client terminal and a plurality of other image forming apparatuses in a local area network so as to be capable of data communication with each other. The image forming apparatus comprising an image forming unit that performs image forming processing on a basis of a print job and a server processing unit that performs server processing to send the client terminal data requested by the client terminal. The operation control program, when being executed, causes a controller of the image forming apparatus to perform the following processing. The processing comprises group management processing including first managing one or more image forming apparatuses each including a server processing unit that performs the server processing among the plurality of other image forming apparatuses, as a first apparatus group, and second managing one or more image forming apparatuses chosen out of the plurality of other image forming apparatuses on a basis of a predetermined standard, as a second apparatus group. The processing further comprises judgement processing including analyzing packet data received from the client terminal, first judging whether a processing request given by the packet data is a data request to the server processing unit or a request to the image forming unit for image forming processing, and second judging whether the image forming apparatus is in a state capable of executing processing at the processing request. The processing further comprises proxy execution control including, on judging that the processing request is a data request to the server processing unit and the image forming apparatus is in a state incapable of executing the processing at the processing request, requesting one of the plurality of other image forming apparatuses belonging to the first apparatus group to execute server processing as proxy for the image forming apparatus, and on judging that the processing request is a request to the image forming unit for image forming processing and the image forming apparatus is in a state incapable of executing the processing at the processing request, requesting one of the plurality of other image forming apparatuses belonging to the second apparatus group to execute the image forming processing as proxy for the image forming apparatus.

An operation control method reflecting one aspect of the present invention is a method to be used in an image forming apparatus to be connected to a client terminal and a plurality of other image forming apparatuses in a local area network so as to be capable of data communication with each other. The image forming apparatus comprises an image forming unit that performs image forming processing on a basis of a print job and a server processing unit that performs server processing to send the client terminal data requested by the client terminal. The operation control method comprises group management processing including first managing one or more image forming apparatuses each including a server processing unit that performs the server processing among the plurality of other image forming apparatuses, as a first apparatus group, and second managing one or more image forming apparatuses chosen out of the plurality of other image forming apparatuses on a basis of a predetermined standard, as a second apparatus group. The operation control method further comprises judgement processing including analyzing packet data received from the client terminal, first judging whether a processing request given by the packet data is a data request to the server processing unit or a request to the image forming unit for image forming processing, and second judging whether the image forming apparatus is in a state capable of executing processing at the processing request. The operation control method further comprises proxy execution control including, on judging that the processing request is a data request to the server processing unit and the image forming apparatus is in a state incapable of executing the processing at the processing request, requesting one of the plurality of other image forming apparatuses belonging to the first apparatus group to execute server processing as proxy for the image forming apparatus, and on judging that the processing request is a request to the image forming unit for image forming processing and the image forming apparatus is in a state incapable of executing the processing at the processing request, requesting one of the plurality of other image forming apparatuses belonging to the second apparatus group to execute the image forming processing as proxy for the image forming apparatus.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1:
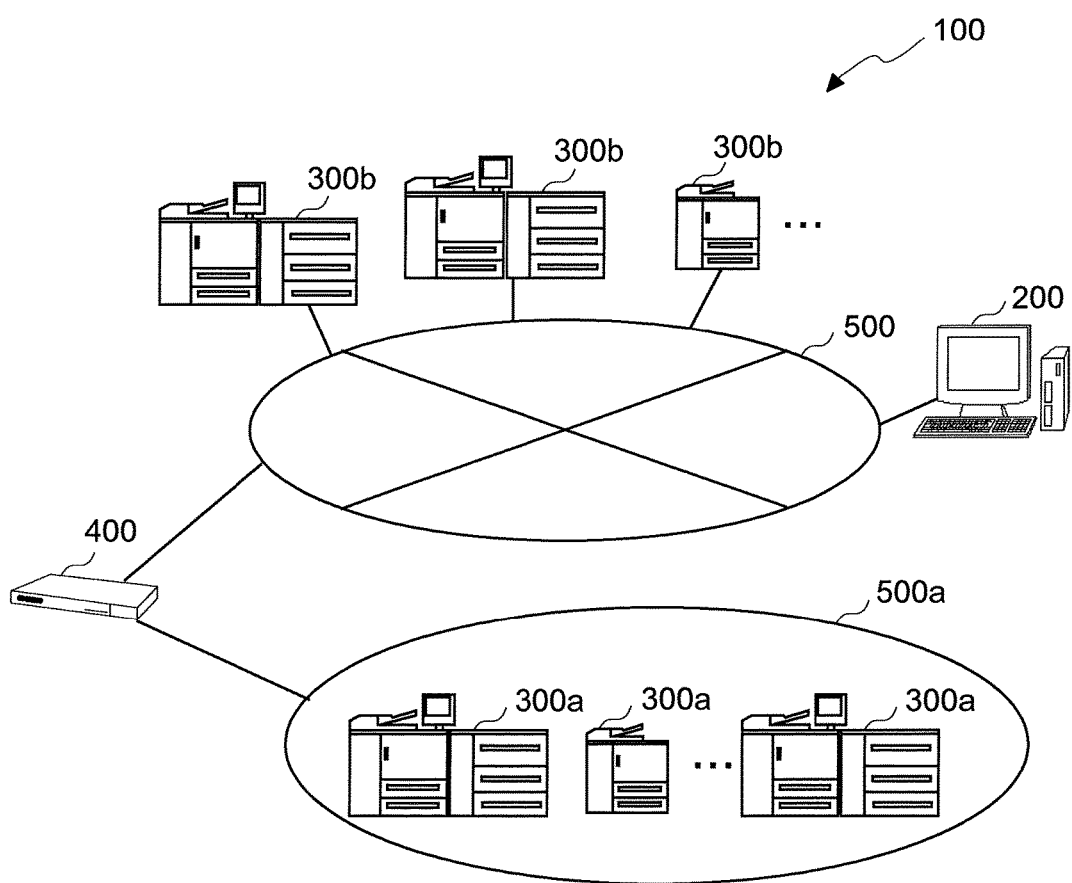
FIG. 1 is a schematic diagram of an example of a network system according to one embodiment of the present invention.

Hereinafter, an embodiment of the present invention will be described with reference to the drawings. However, the scope of the invention is not limited to the illustrated examples.

Image forming apparatuses, non-transitory computer-readable storage media each storing an operation control program, and operation control methods, as embodiments of the present invention, can avoid deterioration about performance and reliability of execution a print job in an image forming apparatus having server functions, for the following reasons.

That is, provided is an image forming apparatus to be connected to a client terminal and a plurality of other image forming apparatuses in a local area network so as to be capable of data communication with each other. The image forming apparatus includes an image forming unit and a server processing unit and is configured to perform the following processing. The image forming apparatus manages, among plural other image forming apparatuses, one or more image forming apparatuses each including a server processing unit, as a first apparatus group, and further manages one or more image forming apparatuses chosen out of the plural of other image forming apparatuses on a basis of a predetermined standard (located within a predetermined physical distance from the image forming apparatus), as a second apparatus group. The image forming apparatus judges whether packet data received from the client terminal includes a processing request to the server processing unit or a processing request to the image forming unit, and judges whether the image forming apparatus is in a state capable of executing processing at the processing request judged. On judging that the processing request is a processing request to the server processing unit and the image forming apparatus is in a state incapable of executing the processing at the processing request, the image forming apparatus requests one of the plural other image forming apparatuses belonging to the first apparatus group to execute server processing as proxy for the image forming apparatus. On judging that the processing request is a processing request to the image forming unit and the image forming apparatus is in a state incapable of executing the processing at the processing request, the image forming apparatus requests one of the plural other image forming apparatuses belonging to the second apparatus group to execute the image forming processing as proxy for the image forming apparatus.

As described in BACKGROUND, in an image forming apparatus which provides server functions additionally to image forming functions and is configured to execute both processing relating to the image forming functions and processing relating to the server functions on the one and same processing unit, the following issues can arise. When requests to use the server functions, sent from client terminals are centralized on one image forming apparatus that is executing of a print job, it can increase the load on a CPU and memory usage of the image forming apparatus, which can result in deterioration about performance of the execution of the print job which is executed together with processing relating to the server functions in parallel. Further, the centralization of requests can affect real-time control of mechanical components of the image forming apparatus and real-time image processing in the image forming apparatus, which can result in deterioration about reliability of the execution of the print job.

In view of them, an embodiment of the present invention provides an image forming apparatus configured to perform the following processing. The image forming apparatus makes a first apparatus group and a second apparatus group out of other image forming apparatuses connected with the image forming apparatus itself in a local area network so as to be capable of data communication mutually, and manages those image forming apparatuses. The first apparatus group is a group of one or more of other image forming apparatuses each including server functions (in other words, a server processing unit), and the second apparatus group is a group of one or more of other image forming apparatus chosen on the basis of a predetermined standard. On receiving a processing request, the image forming apparatus judges whether the image forming apparatus is in a state capable of executing processing based on the processing request, in other words, whether performance and reliability of execution of a print job can be secured even if the processing based on the processing request is executed together with the print job. On judging that the performance and reliability would not be secured (the image forming apparatus is in a state incapable of executing the processing based on the processing request), the image forming apparatus requests one of the plural other image forming apparatuses to execute processing based on the processing request as proxy for the image forming apparatus, in accordance with the kind of the processing request received. That is, if the received processing request is a request to server functions (the server processing unit) for sever processing, the image forming apparatus requests one of the plural other image forming apparatuses belonging to the first apparatus group, which is a group of one or more image forming apparatuses each having server functions, to execute server processing as proxy for the image forming apparatus. If the received processing request is a request to image forming functions (the image forming unit) for image forming processing, the image forming apparatus requests one of the plural other image forming apparatuses belonging to the second apparatus group, which is a group of one or more image forming apparatuses chosen on the basis of a predetermined standard, to execute image forming processing as proxy for the image forming apparatus.

Such an image forming apparatus can control the deterioration of performance and reliability of execution of a print job, which can arise because of a use of server functions of the image forming apparatus.

EXAMPLES

Figure 2:
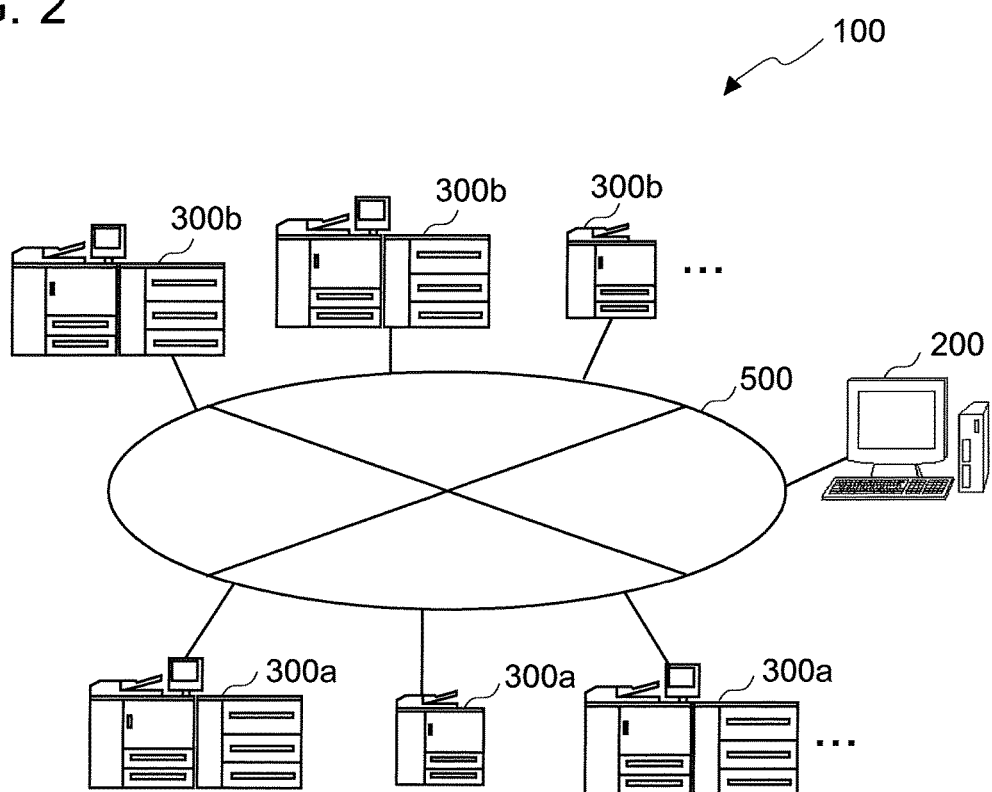
FIG. 2 is a schematic diagram of another example of a network system according to one embodiment of the present invention.
Figure 3:
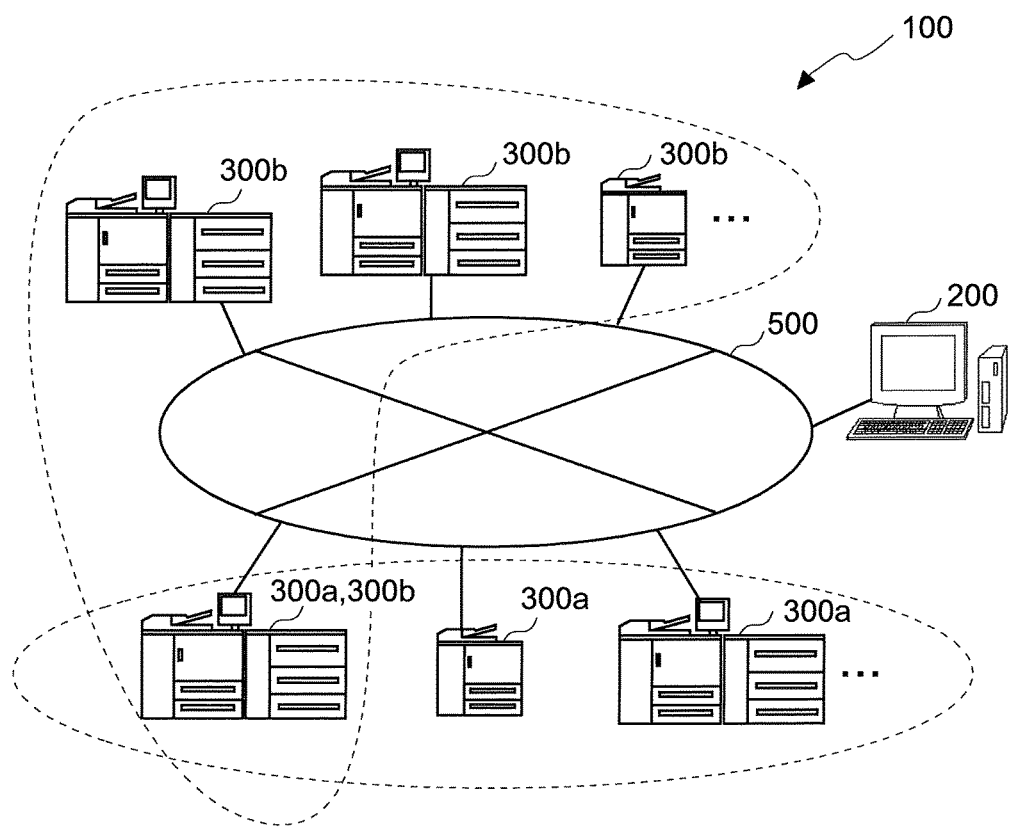
FIG. 3 is a schematic diagram of another example of a network system according to one embodiment of the present invention.
Figure 4A:
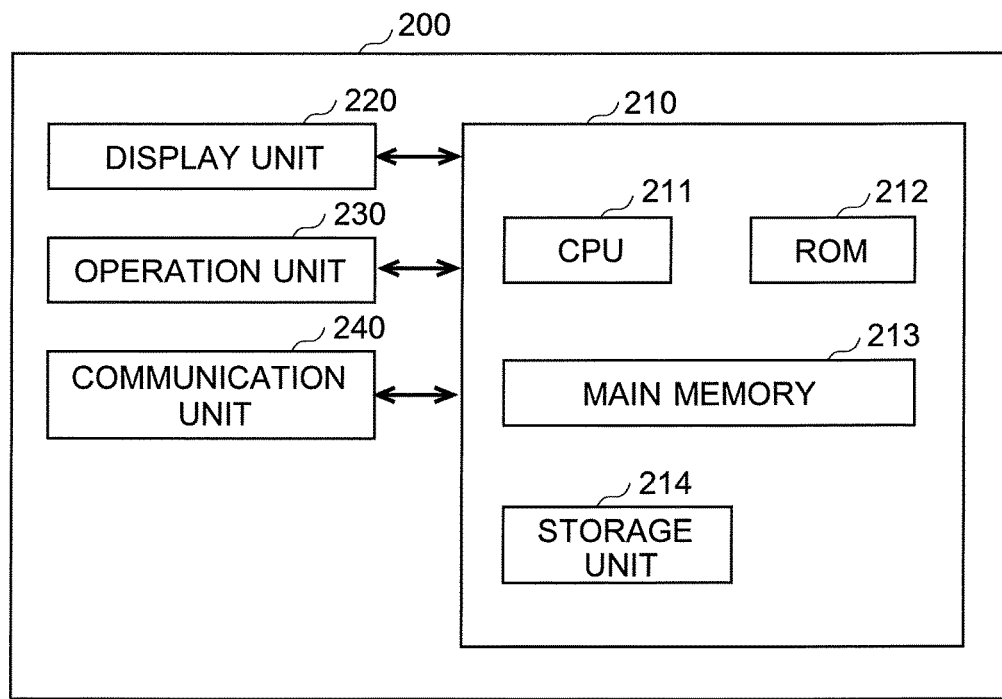
FIGS. 4A and 4B are block diagrams of an example of the structure of a client terminal according to one embodiment of the present invention.
Figure 4B:
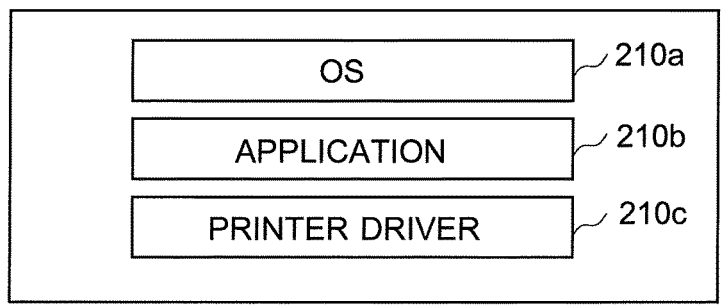
Figure 5A:
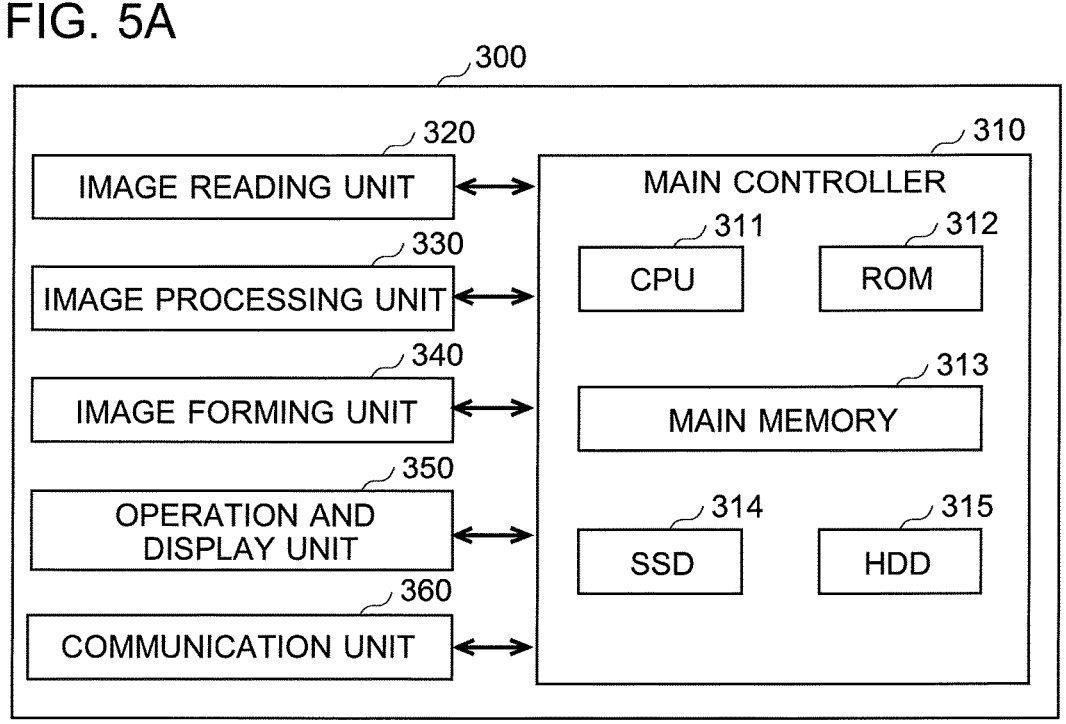
FIGS. 5A and 5B are block diagrams of an example of the structure of an image forming apparatus according to one embodiment of the present invention.
Figure 5B:
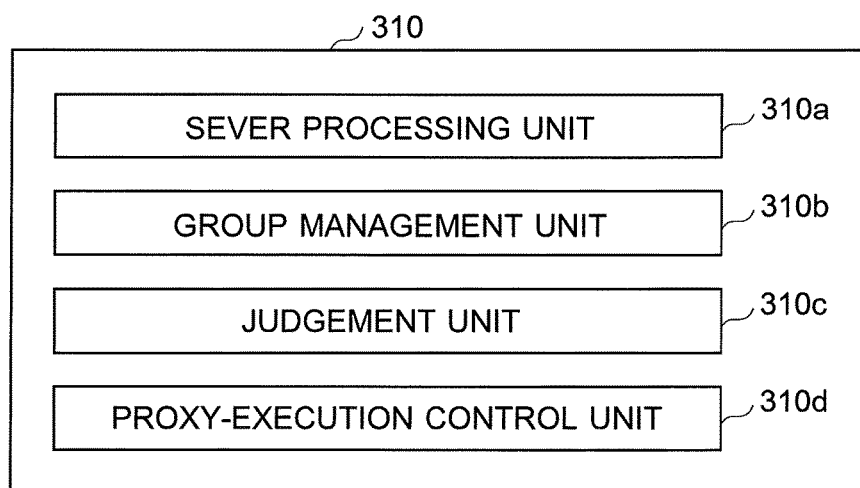
Figure 6:
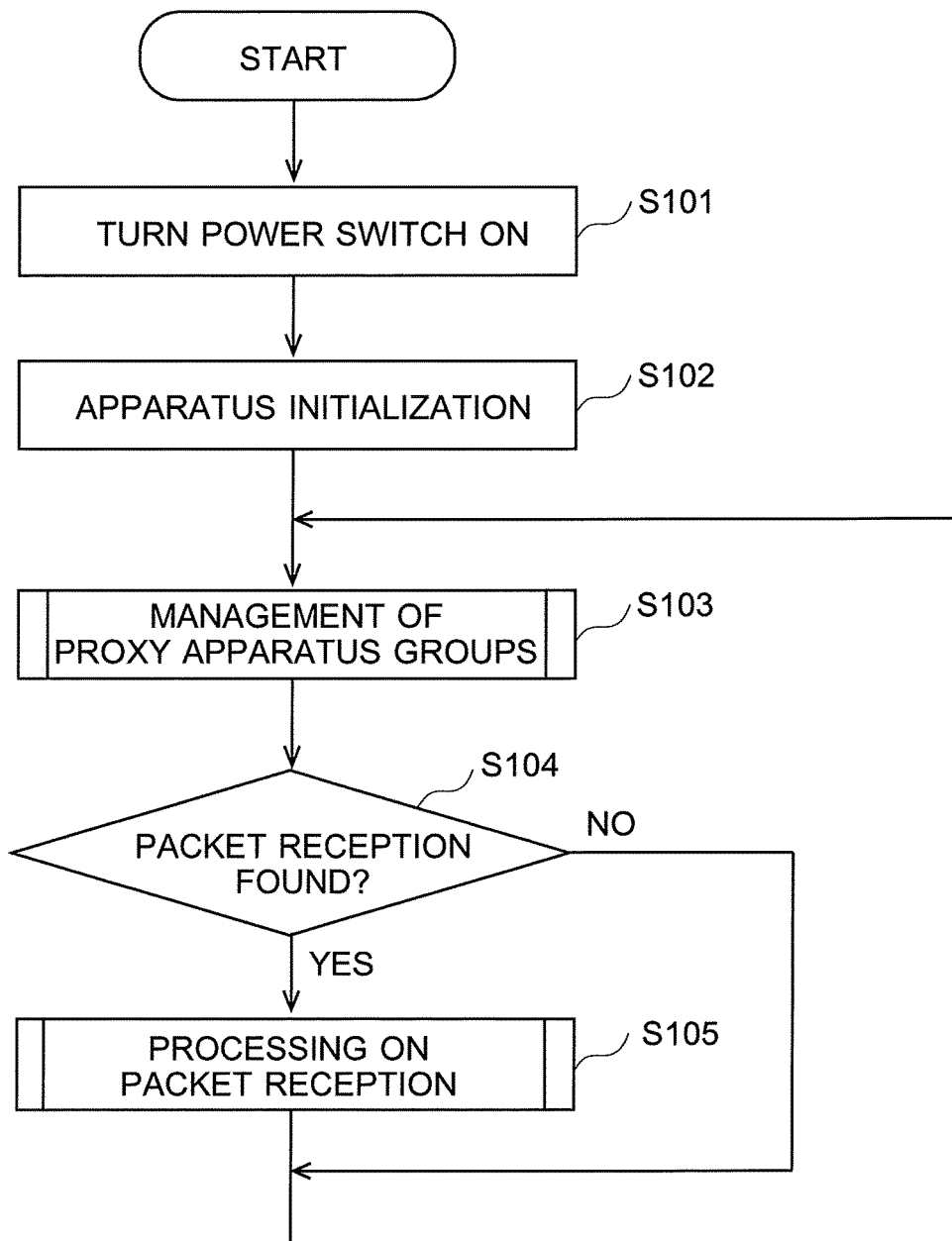
FIG. 6 is a flowchart of an example of operations of the image forming apparatus according to one embodiment of the present invention.
Figure 7:
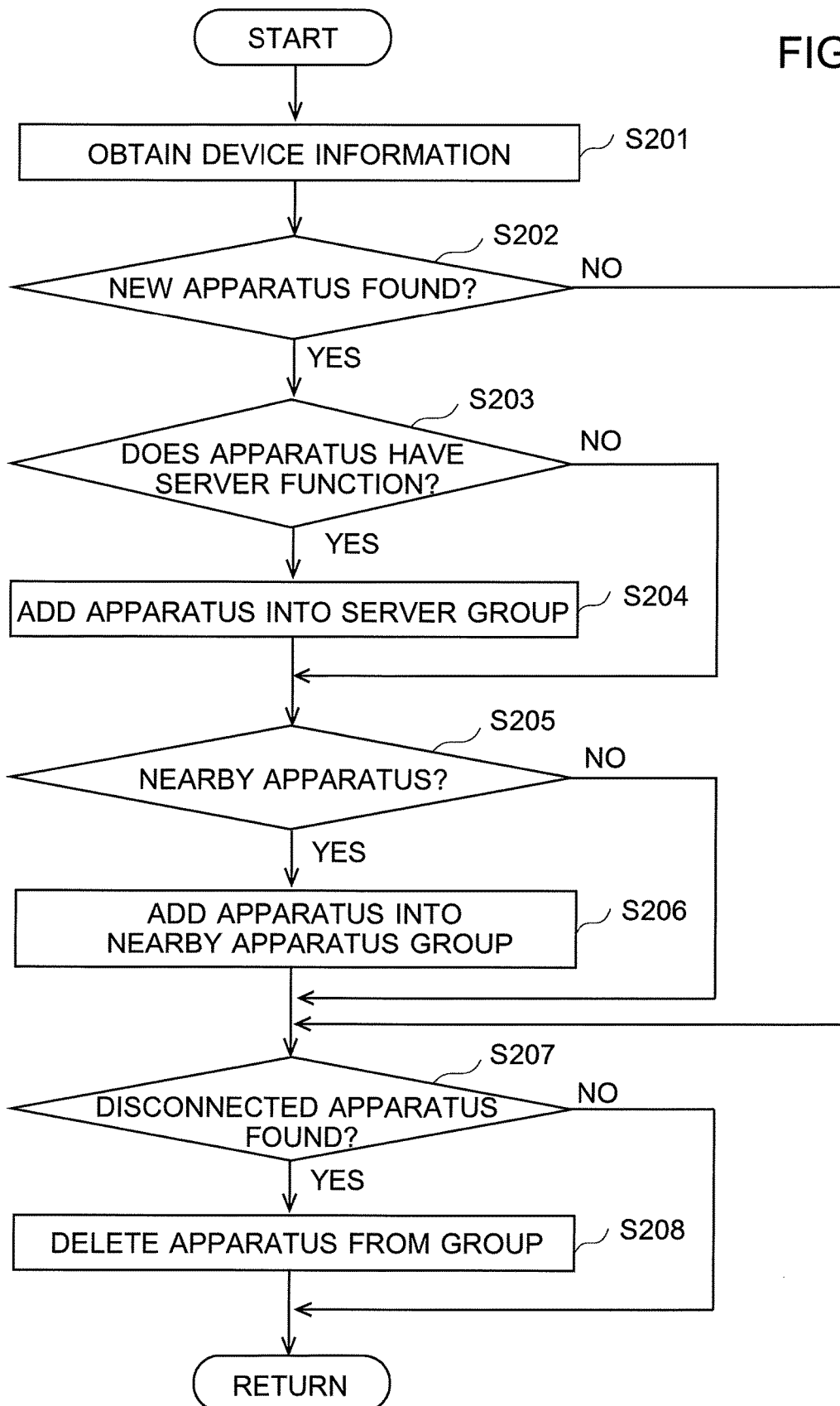
FIG. 7 is a flowchart of an example of operations (management of proxy apparatus group) of the image forming apparatus according to one embodiment of the present invention.
Figure 8:
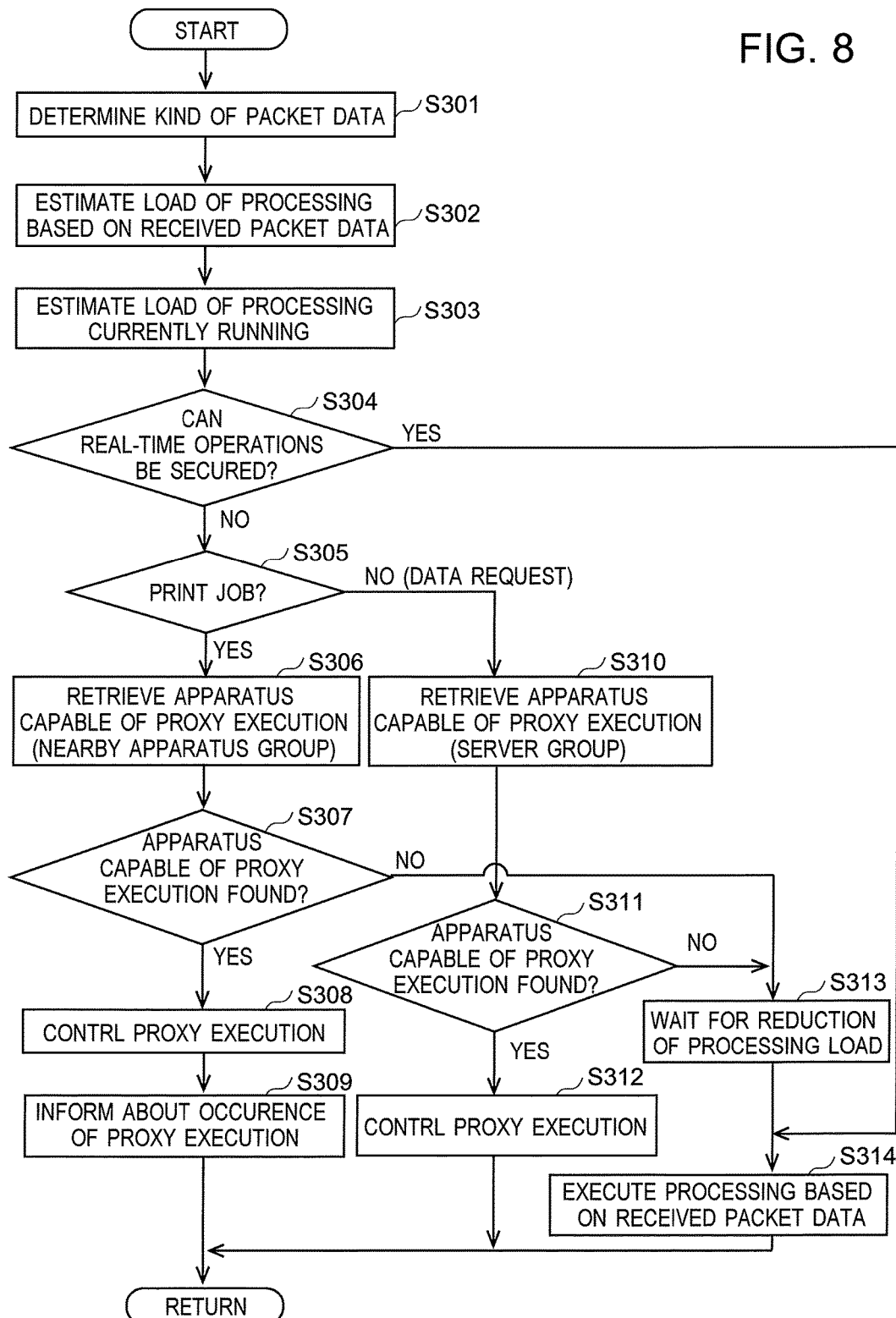
FIG. 8 is a flowchart of an example of operations (processing on packet reception) of the image forming apparatus according to one embodiment of the present invention.

In order to describe in more detail the above-mentioned embodiments of the present invention, a description will be given of an example of an image forming apparatus, a non-transitory computer-readable storage medium storing an operation control program and an operation control method according to the present example, with reference to FIG. 1 to FIG. 8. Each of FIGS. 1 to 3 is a schematic diagram of an example of a network system according to the present example. FIGS. 4A and 4B are block diagrams of an example of the structure of a client terminal according to the present example. FIGS. 5A and 5B are block diagrams of an example of the structure of an image forming apparatus according to the present example. FIGS. 6 to 8 are flowcharts of an example of operations of the image forming apparatus according to the present example.

Network system 100 of the present example includes, as illustrated in FIG. 1, client terminal 200, plural image forming apparatuses 300 and switching hub 400, where the client terminal 200 uses services provided by the system and the plural image forming apparatuses 300 include image forming apparatuses 300a located to be close to each other, and image forming apparatuses 300b each having server functions (a server processing unit). These apparatuses are connected with each other through a network, where examples of the network include a LAN (Local Area Network) defined by specifications, such as Ethernet, Token Ring and FDDI (Fiber-Distributed Data Interface).

In concrete terms, the image forming apparatuses 300a belong to the one and same subnetwork 500a in which apparatuses are addressed with a common network prefix or common high-order bits in their IP (internet Protocol) address, and are communicable with each other through switching hub 400. Apparatuses belonging to the subnetwork 500a and apparatuses belonging to network 500 are connected with each other through switching hub 400, and image forming apparatuses 300b and client terminal 200 both connected to network 500 and image forming apparatuses 300a connected to subnetwork 500a can communicate with each other.

Network system 100 illustrated in FIG. 1 has the structure that image forming apparatuses 300a belong to subnetwork 500a separately from image forming apparatuses 300b and client terminal 200, but it should be noted that how those image forming apparatuses and the client terminal are connected to the network may be defined arbitrarily as far as they are mutually communicable. As another example illustrated in FIG. 2, network system 100 may have a structure such that there is no subnetwork and all the apparatuses in the system are connected to the same network layer. For easy illustration purpose, network system 100 illustrated in FIG. 1 and FIG. 2 has the structure such that image forming apparatuses 300a located to be close to each other, and image forming apparatuses 300b each having server functions (a server processing unit) separately form two apparatus groups, but it should be noted that at least one of image forming apparatuses 300b having server functions (a server processing unit) may belong also to the group of image forming apparatuses 300a located to be close to each other as illustrated in FIG. 3. In the network system 100 illustrated in FIGS. 1 to 3, every image forming apparatus 300 belongs to any of apparatus groups, but it should be noted that image forming apparatuses 300 may include an image fainting apparatus which does not belong to any of the apparatus groups. Hereinafter, a description is given in details of client terminal 200 and image forming apparatus 300 which performs operation control of the present example.

Client Terminals:

Client terminal 200 is a computing device, for example, a personal computer, and is configured to send a processing request to the image forming apparatus 300 which performs the operation control. Client terminal 200 includes, as illustrated in FIG. 4A, controller 210, display unit 220, operation unit 230 and communication unit 240.

Controller 210 includes CPU (Central Processing Unit) 211, ROM (Read Only Memory) 212, main memory 213 and storage unit 214, where examples of the main memory 213 include a RAM (Random Access Memory) and examples of the storage unit 214 include a HDD (Hard Disk Drive) and a SSD (Solid State Drive). CPU 211 reads out control programs stored in ROM 212 or storage unit 214, loads the programs onto main memory 213, and executes the programs, thereby performing the whole operations of client terminal 200. As illustrated in FIG. 4B, controller 210 (CPU 211) is configured to execute OS (Operating System) 210a, application 210b and printer driver 210c.

Examples of OS 210a include Windows, OS X and Android, where Windows is a registered trademark of Microsoft Corporation in the United States and/or other countries, OS X is a trademark of Apple Inc., registered in the U.S. and other countries, and Android is a trademark of Google Inc. in the United States and/or other countries. OS 210a manages document processing application, Web application, printer driver 210c and others in the client terminal 200 so as to function and run the programs.

Examples of application 210b include productivity software, for example, word processing, spreadsheet, and image processing programs, which, on sending print instructions, invokes printer driver 210c and transfers original data created by the productivity software to the printer driver 210c. Examples of application 210b further includes Web application software (for example, a Web browser), which allows a user to use server functions provided by the image forming apparatus 300 and sends the image forming apparatus 300 a processing request to use the server functions.

Printer driver 210c converts original data created by productivity software into a print job in a language that the image forming apparatus 300 can interpret and sends the print job (a processing request to use image forming functions or an image forming unit) to the image Ruining apparatus 300, where examples of the print job include PDL (Page Description Language) data written in page description languages, such as PJL (Printer Job Language), PS (PostScript) and PCL (Printer Control Language); and PDF (Portable Document Format) data. Printer driver 210c writes image forming conditions which were set on a print setup screen of printer driver 210c, into a print ticket to be added to the print job.

Display unit 220 includes a display, for example, a LCD (Liquid Crystal Display) or an organic EL (Electro-Luminescence) display, so as to display a document creation screen of productivity software, a print setup screen of printer driver 210c, a Web browser screen (Web pages) provided by server functions of the image forming apparatus 300 and other screens.

Operation unit 230 includes a device, for example, a mouse and/or a keyboard, and allows an operator to perform various operations to create documents by using productivity software, send a print job (a processing request to use image forming functions) by using printer driver 210c and send a processing request to use server functions provided by the image forming apparatus 300.

Communication unit 240 includes a NIC (Network Interface Card) and/or a modem. The communication unit 240 communicably connects the client terminals 200 to network 500 to send processing requests to use image forming functions and/or server functions of the image forming apparatuses 300.

Image Forming Apparatus:

The image forming apparatus 300 which performs the operation control of the present example is an apparatus, for example, a MFP, including main controller (controller) 310, image reading unit 320, image processing unit 330, image forming unit 340, operation and display unit 350 and communication unit 360.

Main controller 310 includes CPU 311, ROM 312, main memory 313 and storage units including SSD 314 and HDD 315. CPU 311 reads out control programs (including an operation control program which will be described later) stored in ROM 312, SSD 314 or HDD 315, loads the programs onto main memory 313, and executes the programs, thereby performing processing of receiving processing requests sent from client terminal and controls operations of components connected to the main controller 310. The SSD 314 and HDD 315 store various kinds of information including device information of other image forming apparatuses 300 each belonging to a server group or a nearby apparatus group which will be described later, information of the locations of other image forming apparatuses 300 and data to be used when causing any of other image forming apparatuses 300 to work as a file server.

Image reading unit (scanner) 320 is a component capable of reading an original loaded on a platen to optically obtain image data of the original. The image reading unit 320 includes a light source that scans an original, an image sensor like a CCD (Charge Coupled Device), that converts a beam of light reflected on the original into electric signal, and an A/D converter that performs analog-to-digital conversion on the electric signal.

Image processing unit 330 obtains image data by analyzing a print job and rasterizing images of pages contained in the print job to generate image data of the pages. Alternatively, image processing unit 330 obtains scan data from image reading unit 320, optionally performs image processing (including color adjustment, density adjustment and size adjustment) and/or screening on the image data, and then converts the resulting data into image data which can be printed by the image forming unit 340.

Image forming unit (print engine) 340 includes hardware components for use in image forming processing like an electro-photographic or electrostatic recording image-forming process. Image forming unit 340 obtains image data, for example, image data created from a print job or scan data read through image reading unit 320, and prints images based on the image data onto designated sheets. In concrete terms, image forming unit 340 performs following processes. That is, an exposure unit performs exposure processing by irradiating a photoreceptor drum, which is charged by a charging unit, with a laser beam in accordance with an image, to form latent images on the photoreceptor drum. A developing unit develops the latent image by adhering charged toner onto the photoreceptor drum, and the developed toner image is transferred onto a transfer belt (first transfer processing), further is transferred from a transfer belt onto a sheet of paper (second transfer processing), and are fixed onto the sheet by a fixing unit. Image forming unit 340 further includes a sensor for sensing a jam (a paper jam) or a malfunction (for example, a malfunction of sheet transferring components or an out of toner), and in response to sensing a jam or a malfunction, sends information about it to main controller 310.

Operation and display unit (operation panel) 350 includes a device, such as a touch panel which includes a display unit like a liquid crystal display and a pressure-sensitive operation unit in which transparent electrodes arranged on the display unit in a lattice shape. The operation and display unit 350 displays a screen for operating the image forming apparatus 300 and a screen for setting image forming conditions so as to allow a user to set various settings and give various instructions through the screens.

Communication unit 360 includes a NIC and/or a modem, and establishes connections to other image forming apparatuses 300a, 300b and client terminal 200 which are connected with the image forming apparatus 300 through the network.

The main controller 310, as illustrated in FIG. 5B, works as server processing unit 310a, group management unit 310b, judgement unit 310c and proxy-execution control unit 310d.

Server processing unit 310a provides server functions by controlling communication unit 360, SSD 314, HDD 315 and other components. The server functions are functions to, in response to a request from an external device, perform an appropriate processing and provide a result of the processing with the external device (in particular, functions to, in response to a data request which has been received, send requested data to the sender of the request). Examples of the server functions include file server functions, mail server functions, printer server functions and Web server functions. File server functions control access to a storage (SSD 314 or HDD 315) from devices on the network and allow the devices to input data into and/or output data from the storage. Mail server functions transfer outgoing electronic mail messages and incoming electronic mail messages to the respective destinations or addresses. Examples of the mail server functions include functions of a POP (Post Office Protocol) server and a SMTP (Simple Mail Transfer Protocol) server. Printer server functions receive print jobs from client terminal 200, stores and manages the print jobs in a storage (SSD 314 or HDD 315), and distribute the print jobs to the respective image forming apparatuses 300 in the network system 100. Web server functions cause client terminal 200 which works as a Web client to display Web pages on a Web browser so as to allow a user to control the image forming apparatus 300 through the displayed page.

Group management unit 310b obtains device information of plural other image forming apparatuses 300 connected to the local area network, creates a table in which the device information of the plural other image forming apparatuses 300 is written, and controls the plural other image forming apparatuses 300 as groups on the basis of the table. The group management unit 310b includes a first-apparatus-group management section and a second-apparatus-group management section. The first-apparatus-group management section uses the device information, and in response to finding a new image forming apparatus 300 having server functions (a server processing unit) added to the network, registers the image forming apparatus 300 newly found (or adds the image forming apparatus 300 newly found into the table) as a member of a first apparatus group (referred to as a server group), so as to manage one or more of image forming apparatuses 300 each having server functions (a server processing unit) as one group. The second-apparatus-group management section uses the device information (in particular, location information), and in response to finding a newly added image forming apparatus 300 located close to the image forming apparatus 300 which is performing the operation control of the present example (for example, finding a newly added image forming apparatus 300 located within a certain physical distance from the image forming apparatus performing the operation control, or finding a newly added image forming apparatus 300 belonging to the same subnetwork which the image forming apparatus performing the operation control belongs to), registers the image forming apparatus 300 newly found (or adds the image forming apparatus 300 newly found into the table) as a member of a second apparatus group (referred to as a nearby apparatus group), so as to manage nearby image forming apparatuses 300 as one group. In this process, the reason why image forming apparatuses 300 belonging to the same subnetwork are grouped into a nearby apparatus group is that image forming apparatuses 300 addressed with similar IP addresses are located on the same floor in many cases and it is highly probable that such image forming apparatuses 300 are located within a certain physical distance from the image forming apparatus 300 performing the operation control. Further, on finding any of image forming apparatuses 300 having disappeared from the network (in other words, finding any of image forming apparatuses 300 disconnected from the network) on the basis of the apparatus information, the first-apparatus-group management section and the second-apparatus-group management section remove the one of image forming apparatuses 300 which has disappeared from the network, from the group which the apparatus belonged to (or delete the apparatus from the table). The members of the nearby apparatus group depend on the location of the image forming apparatus 300 performing the operation control. The image forming apparatus which is performing the operation control of the present example belongs to both the nearby apparatus group and the server group.

Judgement section 310c judges whether the image forming apparatus 300 performing the operation control is in a state capable of parallel execution of processing currently running in the apparatus and processing to be executed on the basis of a newly received processing request. The judgement unit 310c includes a data-kind determining section, a first processing-load estimation section for processing at a newly received request, a second processing-load estimation section for processing running in the apparatus, and a parallel-execution judgement section. The data-kind determining section determines the kind of processing request (packet data) received, on the basis of header information and/or size of the data. According to the determining result of the data-kind determining section, the first processing-load estimation section estimates a load needed for execution of processing at a received processing request by the image forming apparatus 300 performing the operation control (a load of the processing on components of the image forming apparatus 300, which is mainly a load on the CPU of the image forming apparatus 300). The second processing-load estimation section, on receiving a processing request, estimates a load of processing currently running in the image forming apparatus 300 performing the operation control (a load of the processing on components of the image forming apparatus 300, which is mainly a load on the CPU of the image forming apparatus 300). By using the processing load estimated by the first processing-load estimation section for processing at a newly received request, the parallel-execution judgement section judges whether the image forming apparatus 300 performing the operation control is in a state capable of execution of the processing at the received processing request together in parallel with the processing currently running in the apparatus, on the basis of the following judgement result. For example, the parallel-execution judgement section judges whether a total sum of the processing load (a first load) estimated by the first processing-load estimation section and the processing load (a second load) estimated by the second processing-load estimation section exceeds a predetermined threshold value or not. In other words, the parallel-execution judgement section judges whether real-time operations of the image forming apparatus 300 in image forming processing, which includes real-time control of mechanical parts like the image forming unit of the image forming apparatus 300, can be secured or not. In particular, the parallel-execution judgement section judges whether the real-time operations of the image forming apparatus 300 in image forming processing can be secured during a time period when a peak time period of the first load and a peak time period of the second load are overlapped with each other. On the basis of a result of these judgements, the parallel-execution judgement section judges whether the image forming apparatus 300 performing the operation control is in a state capable of parallel execution of the processing at the received processing request and the processing currently running in the apparatus. In image forming processing, the processing load is in the peak time period during, for example, rasterization with image processing unit 330 or image forming with the image forming unit 340 (which includes control of mechanical components of the image forming apparatus 300). In server processing, the processing load is in the peak time period during, for example, creation of pages for a Web browser. Further, the state that real-time operations of the image forming apparatus 300 in image forming processing, which includes real-time control of mechanical components like the image forming unit of the image forming apparatus 300, can be secured is a state such that the image forming unit 340 can perform every step of image forming processing without being held up. For example, the judgement section 310c judges that the real-time operations can be secured when the processing load of each of the steps does not exceed a predetermined threshold value.

The judgement unit 310c may also judge whether the image forming apparatus 300 performing the operation control is in a state incapable of executing processing at a newly received processing request, on the basis of an occurrence of a jam (a paper jam) or a malfunction of a part of the image forming apparatus 300. To perform the judgement, the judgement unit 310c includes an apparatus-status judging section and an operation judging section. The apparatus-status judging section judges whether an occurrence of a paper jam or a malfunction of a part of the image forming apparatus 300 has been sensed on the basis of the device information. When the apparatus-status judging section judges that a paper jam or a malfunction of a part of the image forming apparatus 300 has occurred, the operation judging section judges that processing which uses a component on which the paper jam or malfunction has occurred cannot be executed.

When the judgement unit 310c judges that the image forming apparatus 300 performing the operation control is in a state incapable of execution of processing at a newly received processing request together in parallel with processing currently running in the apparatus (or in a state that processing which uses a component on which the paper jam or malfunction has occurred cannot be executed), proxy-execution control unit 310d requests one of other image forming apparatuses 300 (image forming apparatus 300a) belonging to the server group to execute server processing as proxy for the image forming apparatus 300 performing the operation control, or requests one of other image forming apparatuses 300 (image forming apparatus 300b) belonging to the nearby apparatus group to execute image forming processing as proxy for the image forming apparatus 300 performing the operation control. The proxy-execution control unit 310d includes a proxy image forming processing control section and a proxy server processing control section. When the processing request received is a print job relating to image forming functions, the proxy image forming processing control section transfers the print job to an apparatus which can perform proxy execution of the print job among image forming apparatuses 300a managed as the nearby apparatus group, to request the apparatus to execute the print job for the image forming apparatus 300 performing the operation control. Successively, the proxy image forming processing control section sends information that the proxy execution has been requested and device information of the image forming apparatus 300 as a sender of the request for proxy execution, to client terminals 200 as a sender of the print job, and/or operates operation and display unit 350 to display those pieces of information thereon. On the other hand, when the processing request received is a data request relating to server functions, the proxy server processing control section transfers the data request to an apparatus which can perform proxy execution of processing at the data request among image forming apparatuses 300b managed as the server group, to request the apparatus to execute the processing based on the data request for the image forming apparatus 300 performing the operation control. Successively, the proxy server processing control section sends instructions to redirect the server connection, to client terminals 200 as a sender of the data request. In this process, there is no need for the proxy server processing control section to send information that the proxy execution has been requested, to the client terminals 200 as a sender of the data request. When finding no apparatus which can perform proxy execution among other image forming apparatuses 300a, 300b, proxy-execution control unit 310d is on standby until the processing load of the image forming apparatus 300 performing the operation control goes into the state that the load of processing currently running in the apparatus and the processing at the received processing request can be executed together in parallel (or until the jam or malfunction has been resolved).

The server processing unit 310a, group management unit 310b, judgement unit 310c and proxy-execution control unit 310d may be constituted as hardware devices. Alternatively, the server processing unit 310a, group management unit 310b, judgement unit 310c and proxy-execution control unit 310d (in particular, the group management unit 310b, judgement unit 310c and proxy-execution control unit 310d) may be provided by an operation control program which causes main controller (controller) 310 to function as these units (which causes the image forming apparatus 300 to perform processing of group management, judgement processing and control of proxy execution) when being executed by CPU 311. That is, the main controller 310 may be configured to serve as the server processing unit 310a, group management unit 310b, judgement unit 310c and proxy-execution control unit 310d (in particular, the group management unit 310b, judgement unit 310c and proxy execution control unit 310d), when CPU 311 executes the operation control program.

It should be noted that FIGS. 1 to 5B show network system 100, client terminal 200 and image forming apparatus 300 of the present example for illustrative purpose only, and their structures can be modified appropriately. For example, FIGS. 5A and 5B show the structure of the image forming apparatus 300 which performs the operation control of the present example but other image forming apparatuses 300a belonging to the nearby apparatus group may include no server processing unit 310a in main controller 310. Further, the image forming apparatus 300 of the present example, illustrated in FIGS. 5A and 5B, includes image reading unit 320 and image forming unit 340, but the image forming apparatus 300 can be a printer which does not include image reading unit 320 or a facsimile having communication function using a telephone line. Further, the image forming apparatus 300 of the present example, illustrated in FIGS. 5A and 5B, includes SSD 314 and HDD 315 as a storage unit in main controller 310 so as to store programs mainly in SSD 314 and store data mainly in HDD 315, but it should be noted that the storage unit may have an arbitrary structure. For example, the SSD 314 or the HDD 315 may be omitted.

A description is given hereinafter of operations of the image forming apparatus 300 performing the operation control of the present example. CPU 311 reads out an operation control program stored in ROM 312, loads the program onto main memory 313, and executes the program, thereby causing main controller 310 to perform the processes of the steps of the flowcharts illustrated in FIGS. 6 to 8.

Overall Processing:

As illustrated in FIG. 6, in response that a user turns on a power switch of the image forming apparatus 300 which was in a power-off state (S101), main controller 310 performs apparatus initialization (S102). After completion of the apparatus initialization, main controller 310 causes operation and display unit 350 to display a user interface screen so that a user can operate the image forming apparatus 300 on the screen.

Next, main controller 310 (group management unit 310b) performs management of proxy apparatus groups (S103), where the management includes collecting and managing device information of other image forming apparatuses 300 in the network system in order to request any of other image forming apparatuses 300 for proxy execution of processing based on a received processing request. A description will be given below of the management of proxy apparatus groups in detail.

Successively, main controller 310 monitors reception of packet data sent through the network (S104). In response to receiving packet data (a processing request), main controller 310 performs processing on packet reception (S105). A description will also be given below of the processing on packet reception in detail.

Additionally to the processes illustrated in FIG. 6, the image forming apparatus 300 performing the operation control offers its functions to a user according to a user's request, as follows. On judging that the image forming apparatus 300 is in the state capable of executing processing at a received print job, the image forming apparatus 300 offers its image forming functions according to a user's request by using image forming unit 340. On the other hand, on judging that the image forming apparatus 300 is in the state capable of executing processing at a processing request for server functions, the image forming apparatus 300 offers its server functions according to a user's request by using server processing unit 310a.

Management of Proxy Apparatus Groups:

As illustrated in FIG. 7, main controller 310 (group management unit 310b) obtains device information of image forming apparatuses 300 connected to network 500 so as to be capable of data communication with each other, by using an arbitrary network protocol (for example, HTTP or Hyper Text Transfer Protocol) (S201). The main controller 310 (group management unit 310b) may obtain the device information by using, for example, MIB (Management Information Base) which is managed according to SNMP (Simple Network Management Protocol).

Next, main controller 310 (group management unit 310b) checks the device information obtained and judges whether there is a newly added image forming apparatus in the image forming apparatuses 300, in comparison with the image forming apparatuses 300 at the previous checking (S202). On finding no new apparatus among the image forming apparatuses 300, the process goes to S207. On finding a new apparatus added in the image forming apparatuses 300, main controller 310 (group management unit 310b) judges whether the image forming apparatus 300 newly found has sever functions (or a server processing unit) (S203), and adds (registers) the image forming apparatus 300 newly found into the server group if the image forming apparatus 300 has server functions (or a server processing unit) (S204).

Next, main controller 310 (group management unit 310b) refers to the obtained device information (location information) and judges whether the newly added image forming apparatus 300 is located close to the image forming apparatus 300 performing the operation control of the present example (S205). On judging that the newly added image forming apparatus 300 is located close to the image forming apparatus 300 performing the operation control (the newly added image forming apparatus 300 is located within a certain physical distance from the image forming apparatus 300 performing the operation control or belongs to the same subnetwork to which the image forming apparatus 300 performing the operation control), main controller 310 (group management unit 310*b*) adds or registers the newly added image forming apparatus 300 into the nearby apparatus group (S206).

Next, main controller 310 (group management unit 310*b*) checks the device information obtained in S201 and judges whether any of image forming apparatuses 300 connected to the network has disappeared from the network in comparison with the image forming apparatuses 300 at the previous checking (S207). On finding any of image forming apparatuses 300 having disappeared (disconnected from the network), main controller 310 (group management unit 310*b*) removes the disconnected image forming apparatus 300 from the group to which the apparatus belonged to (S208).

Processing on Packet Reception:

As illustrated in FIG. 8, main controller 310 (judgement unit 310*c*) determines the kind of packet data (a processing request) received, on the basis of header information and/or size of the data (S301). According to a result of the determination, main controller 310 (judgement unit 310*c*) estimates a load needed for execution of processing based on the received packet data by the image forming apparatus 300 which is performing the operation control (S302). For example, the main controller 310 (judgement unit 310*c*) uses a table prepared in advance, where in the table CPU loads corresponding to various kinds of packet data are written, and estimates a CPU load needed for execution of the processing based on the received packet data by referring to the table.

Next, main controller 310 (judgement unit 310*c*), on receiving a packet data, estimates a load of the processing which is running or being executed in the image forming apparatus 300 performing the operation control (S303). For example, the main controller 310 (judgement unit 310*c*) uses a table prepared in advance, where in the table CPU loads corresponding to various kinds of image forming function are written, and estimates a CPU load of the processing which is running, by referring to the table. On the basis of the processing loads estimated in S302 and S303, main controller 310 (judgement unit 310*c*) judges whether the image forming apparatus 300 performing the operation control is in a state that real-time operations of the image forming apparatus 300 in image forming operations, for example, real-time control of mechanical components, can be secured when the image forming apparatus 300 performs execution of the processing based on the received packet data together in parallel with the processing which is currently running (in other words, in a state capable of execution of the processing at the received packet data together in parallel with the processing which is currently running) (S304).

On judging that the real-time operations can be secured, main controller 310 (proxy-execution control unit 310*d*) executes the processing based on the received packet data without proxy execution (S314). On the other hand, on judging that the real-time operations would not be secured (for example, on judging that the total sum of the processing load estimated in S302 and the processing load estimated in S303 exceeds a predetermined threshold value), main controller 310 (proxy-execution control unit 310*d*) requests one of other image forming apparatus 300 to perform proxy execution of the processing (to execute the processing as proxy for the image forming apparatus 300 performing the operation control) according to the kind of received packet data.

In concrete terms, main controller 310 (proxy-execution control unit 310*d*) judges whether the processing request received is a print job relating to image forming processing (S305). On judging that the processing request is a print job, main controller 310 (proxy-execution control unit 310*d*) retrieves an apparatus which can performs proxy execution of the processing at the print job among image forming apparatuses 300*a* managed as the nearby apparatus group (S306). On finding an apparatus which can perform the proxy execution (YES in S307), main controller 310 (proxy-execution control unit 310*d*) transfers the print job to the apparatus which can perform the proxy execution retrieved from the image forming apparatuses 300*a*, to request the apparatus to perform the proxy execution (S308). In this process, main controller 310 (proxy-execution control unit 310*d*) sends information that the proxy execution has been requested and device information of one of the image forming apparatuses 300*a* as the destination of the request to perform the proxy execution, to client terminal 200 as a sender of the processing request (S309), since such control needs a user to go to the image forming apparatus 300*a* which performs the proxy execution and pick up printed materials from the apparatus. If needed, main controller 310 (proxy-execution control unit 310*d*) may control operation and display unit 350 to display those pieces of information.

On judging that the processing request received is a data request relating to server functions (NO in S305), main controller 310 (proxy-execution control unit 310*d*) retrieves an apparatus which can performs proxy execution of processing at the data request among image forming apparatuses 300*b* managed as the server group (S310). On finding an apparatus which can perform the proxy execution (YES in S311), main controller 310 (proxy-execution control unit 310*d*) transfers the data request to the apparatus which can perform the proxy execution retrieved from the image forming apparatuses 300*b*, to request the apparatus to perform the proxy execution, and sends instructions to client terminal 200 as the sender of the request to redirect the destination of server connection (S312).

On finding no apparatus which can performs proxy execution based on the received processing request among other image forming apparatuses 300 (NO in S307 or NO in S311), main controller 310 (proxy-execution control unit 310*d*) is on standby until the processing load of the image forming apparatus 300 performing the operation control of is sufficiently reduced, in other words, goes into the state that the processing to be executed on the basis of the received packet data can be executed together in parallel with the processing which is currently running (S313). When the processing load goes into the state capable of the parallel execution, main controller 310 (proxy-execution control unit 310*d*) executes processing based the processing request received (S314).

As a state that real-time operations cannot be secured, the following situation can be expected. That is, during execution of a print job, the image forming apparatus 300 which performs the operation control receives an increased number of data requests relating to the server functions so that it can cause failure of real-time operations of the image forming apparatus 300, including real-time control of mechanical components relating to image forming processing in the image forming apparatus 300. When such a situation arises, main controller 310 (proxy-execution control unit 310*d*) preferably transfers the data requests to the server functions, to one of other image forming apparatuses 300*b*.

As another state that real-time operations cannot be secured, the following situation can be expected. That is, during execution of server processing, the image forming apparatus 300 which performs the operation control receives and executes a print job and the load of the server processing which is currently running or being executed also can cause failure of real-time operations of the image faulting apparatus 300, including real-time control of mechanical components relating to image forming processing of the apparatus. When such a situation arises, main controller 310 (proxy-execution control unit 310*d*) preferably transfers the print job received to one of other image forming apparatuses 300*a*.

As described above, the image forming apparatus 300 performing the operation control of the present example is configured to transfer a data request to server functions (the server processing unit) to one of other image forming apparatuses 300*b* or transfer a print job received to one of other image forming apparatuses 300*a*, on judging that the image forming apparatus 300 performing the operation control is in a state incapable of execution of processing at the received processing request together in parallel with the processing which is currently running. Such control can restrict deterioration about performance and reliability of execution of the print job which comes from a use of server functions of the image forming apparatus 300 during the execution of the print job.

The present invention should not be limited to the description in the above embodiments and examples, and its constitution and control can be modified appropriately unless the modification deviates from the intention of the present invention.

For example, examples of image forming functions include copy functions, scan functions, print functions and fax functions; and examples of server functions include file server functions, mail server functions, printer server functions, cloud server functions, Web server functions, groupware server functions and server functions of a core computer system. However, functions of the image forming apparatus should not be limited to those functions.

Further, the image forming apparatus of the above-described example, is configured to estimate the load needed for execution of processing at a received processing request, judges whether the image forming apparatus is in a state capable of execution the processing at the received processing request together in parallel with the processing which is currently running or is executed in the apparatus, and requests, on the basis of a result of the judgement, one of other image forming apparatuses to execute the processing at the processing request as proxy for the image forming apparatus of the present example. Such the control may be applied similarly to a situation that the image framing apparatus judges that requested processing cannot be executed because of an occurrence of a malfunction of a part of the image forming apparatus or a paper jam, and requests one of other image forming apparatuses to execute the requested processing as proxy of the image forming apparatus.

The present invention is applicable to an image forming apparatus providing server functions, an operation control program for controlling operations of the image forming apparatus, a non-transitory computer-readable storage medium storing the operation control program, and an operation control method.

The invention claimed is:

1. An image forming apparatus to be connected to a client terminal and a plurality of other image forming apparatuses in a local area network so as to be capable of data communication with each other, the image forming apparatus comprising:
    an image forming unit that performs image forming processing on a basis of a print job;
    a server processing unit that performs server processing to send the client terminal data requested by the client terminal;
    a group management unit that
        manages one or more image forming apparatuses each including a server processing unit that performs the server processing among the plurality of other image forming apparatuses, as a first apparatus group, and
        further manages one or more image forming apparatuses chosen out of the plurality of other image forming apparatuses on a basis of a predetermined standard, as a second apparatus group;
    a judgement unit that
        analyzes packet data received from the client terminal,
        judges whether a processing request given by the packet data is a data request to the server processing unit or a request to the image forming unit for image forming processing, and
        judges whether the image forming apparatus is in a state capable of executing processing at the processing request; and
    a proxy execution control unit that
        on judging that the processing request is a data request to the server processing unit and the image forming apparatus is in a state incapable of executing the processing at the processing request, requests one of the plurality of other image forming apparatuses belonging to the first apparatus group to execute server processing as proxy for the image forming apparatus, and
        on judging that the processing request is a request to the image forming unit for image forming processing and the image forming apparatus is in a state incapable of executing the processing at the processing request, requests one of the plurality of other image forming apparatuses belonging to the second apparatus group to execute the image forming processing as proxy for the image forming apparatus.

2. The image forming apparatus of claim 1,
wherein the judgement unit judges whether the image forming apparatus is in a state capable of parallel execution of the processing at the processing request and processing currently running in the image forming apparatus.

3. The image forming apparatus of claim 2,
wherein the judgement unit
    estimates a first load needed for execution of the processing at the processing request,
    estimates a second load of the processing currently running in the image forming apparatus, and
    in accordance with whether a total sum of the first load and the second load exceeds a predetermined threshold value, judges whether the image forming apparatus is in the state capable of parallel execution of the processing at the processing request and the processing currently running in the image forming apparatus.

4. The image forming apparatus of claim 2,
wherein the judgement unit, on judging that real-time operations of the image forming apparatus in the image forming processing can be secured, judges that the image forming apparatus is in the state capable of parallel execution of the processing at the processing request and the processing currently running in the image forming apparatus.

5. The image forming apparatus of claim 4,
wherein the judgement unit, on judging that the real-time operations of the image forming apparatus in the image forming processing can be secured during a time period when a peak time period of the first load and a peak time period of the second load are overlapped with each other, judges that the image forming apparatus is in the state capable of parallel execution of the processing at the processing request and the processing currently running in the image forming apparatus.

6. The image forming apparatus of claim 1,
wherein the judgement unit, on sensing an occurrence of a paper jam or a malfunction in the image forming apparatus, judges that the image forming apparatus is in the state incapable of executing the processing at the processing request.

7. The image forming apparatus of claim 1,
wherein the proxy execution control unit,
on requesting one of the plurality of other image forming apparatuses belonging to the second apparatus group for proxy execution of the image forming processing, sends information that the proxy execution of the image forming processing has been requested, to the client terminal as a sender of the request for the image forming processing, and
on requesting one of the plurality of other image forming apparatuses belonging to the first group for proxy execution of the server processing, sends no information that the proxy execution of the server processing has been requested, to the client terminal as a sender of the data request.

8. The image forming apparatus of claim 1,
wherein the group management unit chooses one or more image forming apparatuses belonging to the second apparatus group, out of the plurality of other image forming apparatuses, the one or more image forming apparatuses being located within a predetermined physical distance from the image forming apparatus.

9. The image forming apparatus of claim 1,
wherein the group management unit chooses one or more image forming apparatuses belonging to the second apparatus group, out of the plurality of other image forming apparatuses, the one or more image forming apparatuses belonging to a subnetwork which the image forming apparatus belongs to.

10. A non-transitory computer-readable storage medium storing an operation control program to be executed in an image forming apparatus to be connected to a client terminal and a plurality of other image forming apparatuses in a local area network so as to be capable of data communication with each other, the image forming apparatus comprising an image forming unit that performs image forming processing on a basis of a print job and a server processing unit that performs server processing to send the client terminal data requested by the client terminal, the operation control program, when being executed, causing a controller of the image forming apparatus to perform processing comprising:
group management processing including
first managing one or more image forming apparatuses each including a server processing unit that performs the server processing among the plurality of other image forming apparatuses, as a first apparatus group, and
second managing one or more image forming apparatuses chosen out of the plurality of other image forming apparatuses on a basis of a predetermined standard, as a second apparatus group;
judgement processing including
analyzing packet data received from the client terminal,
first judging whether a processing request given by the packet data is a data request to the server processing unit or a request to the image forming unit for image forming processing, and
second judging whether the image forming apparatus is in a state capable of executing processing at the processing request; and
proxy execution control including,
on judging that the processing request is a data request to the server processing unit and the image forming apparatus is in a state incapable of executing the processing at the processing request, requesting one of the plurality of other image forming apparatuses belonging to the first apparatus group to execute server processing as proxy for the image forming apparatus, and
on judging that the processing request is a request to the image forming unit for image forming processing and the image forming apparatus is in a state incapable of executing the processing at the processing request, requesting one of the plurality of other image forming apparatuses belonging to the second apparatus group to execute the image forming processing as proxy for the image forming apparatus.

11. The non-transitory computer-readable storage medium of claim 10,
wherein the second judging includes judging whether the image forming apparatus is in a state capable of parallel execution of the processing at the processing request and processing currently running in the image forming apparatus.

12. The non-transitory computer-readable storage medium of claim 11,
wherein the second judging includes
estimating a first load needed for execution of the processing at the processing request,
estimating a second load of the processing currently running in the image forming apparatus, and
in accordance with whether a total sum of the first load and the second load exceeds a predetermined threshold value, judging whether the image forming apparatus is in the state capable of parallel execution of the processing at the processing request and the processing currently running in the image forming apparatus.

13. The non-transitory computer-readable storage medium of claim 11,
wherein the second judging includes,
on judging that real-time operations of the image forming apparatus in the image forming processing can be secured, judging that the image forming apparatus is in the state capable of parallel execution of the processing at the processing request and the processing currently running in the image forming apparatus.

14. The non-transitory computer-readable storage medium of claim 13,
wherein the second judging includes,
on judging that the real-time operations of the image forming apparatus in the image forming processing can be secured during a time period when a peak time period of the first load and a peak time period of the second load are overlapped with each other, judging that the image forming apparatus is in the state capable of parallel execution of the processing at the processing request and the processing currently running in the image forming apparatus.

15. The non-transitory computer-readable storage medium of claim 10,
   wherein the second judging includes,
      on sensing an occurrence of a paper jam or a malfunction in the image forming apparatus, judging that the image forming apparatus is in the state incapable of executing the processing at the processing request.

16. The non-transitory computer-readable storage medium of claim 10,
   wherein the proxy execution control processing includes,
      on requesting one of the plurality of other image forming apparatuses belonging to the second apparatus group for proxy execution of the image forming processing, sending information that the proxy execution of the image forming processing has been requested, to the client terminal as a sender of the request for the image forming processing, and
      on requesting one of the plurality of other image forming apparatuses belonging to the first group for proxy execution of the server processing, sending no information that the proxy execution of the server processing has been requested, to the client terminal as a sender of the data request.

17. The non-transitory computer-readable storage medium of claim 10,
   wherein the second managing includes choosing one or more image forming apparatuses belonging to the second apparatus group, out of the plurality of other image forming apparatuses, the one or more image forming apparatuses being located within a predetermined physical distance from the image forming apparatus.

18. The non-transitory computer-readable storage medium of claim 10,
   wherein the second managing includes choosing one or more image forming apparatuses belonging to the second apparatus group, out of the plurality of other image forming apparatuses, the one or more image forming apparatuses belonging to a subnetwork which the image forming apparatus belongs to.

19. An operation control method to be used in an image forming apparatus to be connected to a client terminal and a plurality of other image forming apparatuses in a local area network so as to be capable of data communication with each other, the image forming apparatus comprising an image forming unit that performs image forming processing on a basis of a print job and a server processing unit that performs server processing to send the client terminal data requested by the client terminal, the operation control method comprising:
   group management processing including
      first managing one or more image forming apparatuses each including a server processing unit that performs the server processing among the plurality of other image forming apparatuses, as a first apparatus group, and
      second managing one or more image forming apparatuses chosen out of the plurality of other image forming apparatuses on a basis of a predetermined standard, as a second apparatus group;
   judgement processing including
      analyzing packet data received from the client terminal,
      first judging whether a processing request given by the packet data is a data request to the server processing unit or a request to the image forming unit for image forming processing, and
      second judging whether the image forming apparatus is in a state capable of executing processing at the processing request; and
   proxy execution control including,
      on judging that the processing request is a data request to the server processing unit and the image forming apparatus is in a state incapable of executing the processing at the processing request, requesting one of the plurality of other image forming apparatuses belonging to the first apparatus group to execute server processing as proxy for the image forming apparatus, and
      on judging that the processing request is a request to the image forming unit for image forming processing and the image forming apparatus is in a state incapable of executing the processing at the processing request, requesting one of the plurality of other image forming apparatuses belonging to the second apparatus group to execute the image forming processing as proxy for the image forming apparatus.

* * * * *